(12) United States Patent
Williamson et al.

(10) Patent No.: US 10,775,178 B2
(45) Date of Patent: Sep. 15, 2020

(54) SPATIO-TEMPORAL RE-ROUTING OF NAVIGATION

(71) Applicant: International Business Machines Corporation, Armonk, NY (US)

(72) Inventors: Leigh Williamson, Austin, TX (US);
Vijay Ekambaram, Channai (IN);
Shinoj Zacharias, Bangalore (IN);
Roger Snook, Charles Town, WV (US);
Howard N. Anglin, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/103,072

(22) Filed: Aug. 14, 2018

(65) Prior Publication Data

US 2020/0056897 A1 Feb. 20, 2020

(51) Int. Cl.
*G01C 21/34* (2006.01)
*G06K 9/00* (2006.01)
*G01C 21/36* (2006.01)

(52) U.S. Cl.
CPC ..... *G01C 21/3415* (2013.01); *G01C 21/3484* (2013.01); *G01C 21/3602* (2013.01); *G06K 9/00791* (2013.01)

(58) Field of Classification Search
CPC .......... G08G 1/0133; G08G 1/096844; G08G 1/205; G01C 21/3415; B60W 2520/10;
(Continued)

(56) References Cited

U.S. PATENT DOCUMENTS 7,269,504 B2 * 9/2007 Gardner ................. G01C 21/26
340/988
7,512,487 B1 3/2009 Golding et al.
(Continued)

FOREIGN PATENT DOCUMENTS

CN 205679239 11/2016

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Dalena Tran
(74) *Attorney, Agent, or Firm* — Heslin Rothenberg Farley & Mesiti P.C.; Robert Shatto, Esq.

(57) ABSTRACT

A method, computer program product, and a system where a processor(s) monitors activities of a user operating a vehicle with a navigational device providing route guidance, via a first route, to a geographic destination. The processor(s) identifies driving patterns of the user to generate a driver profile for the user, including a baseline activity pattern. The processor(s) determines, at a given time, that the monitored activities of the user are outside of the baseline activity pattern and enables an integrated image capture device in the vehicle and captures images of an environment outside of a the vehicle. The processor(s) utilizes the image capture device, to capture images and derives data describing environmental conditions, based on performing a semantic analysis of the images. The processor(s) transmits the data to a repository and generates a second route to the destination, based on the driver profile and relevant data from the repository data.

20 Claims, 8 Drawing Sheets

(58) Field of Classification Search
CPC ....... B60W 2520/105; B60W 2540/10; B60W 2540/12; B60W 40/09; B60W 50/04
USPC ...... 701/411, 1, 70, 117, 424; 348/143, 148, 348/149, 207.99; 340/937, 936; 180/170; 382/103
See application file for complete search history.

(56) References Cited

U.S. PATENT DOCUMENTS

| | | |
|---|---|---|
| 8,718,925 B2 | 5/2014 | Letchner et al. |
| 9,037,397 B2 | 5/2015 | Peri |
| 2011/0118969 A1* | 5/2011 | Krishnaswamy ........ A61B 5/18 701/532 |
| 2012/0078509 A1* | 3/2012 | Choi .................. G01C 21/3415 701/423 |
| 2012/0150429 A1* | 6/2012 | Siotos ................ G01C 21/3484 701/411 |
| 2015/0260531 A1* | 9/2015 | Ehsani ............... G01C 21/3461 701/538 |

* cited by examiner

SPATIO-TEMPORAL RE-ROUTING OF NAVIGATION

BACKGROUND

Automotive navigation systems are used by drivers to receive routes, via step-by-step directions, to selected destinations. Many of these navigational systems (and devices) rely on satellite navigation systems to obtain a current position of a device and to correlate data describing the current position to a position on a road. Existing navigational devices, which can be integrated into personal computing devices or can be stand-alone devices, provide many features that enable flexibility in navigation, including destination searches, routing and re-routing, integration with social networks to find contacts, identifying traffic congestion, and identifying points of interest. These devices can receive input from users in a variety of ways, including receiving manual input, voice input, and haptic input. Existing devices can perform dead reckoning, a process of calculating a user's current position by using a previously determined position, or fix, and advancing that position, based upon known or estimated speeds, over elapsed time, and course, by using distance data from sensors attached to a vehicle's drivetrain. A gyroscope and an accelerometer can also be utilized as GPS signal loss and/or multipath can occur during routes that include urban canyons and tunnels. Some existing GPS navigation systems are integrated with weather service providers such that a navigational device can provide enhanced information regarding adverse weather events that may be experienced during a trip, however, this information is not utilized by these existing system to inform routing functionality.

SUMMARY

Shortcomings of the prior art are overcome and additional advantages are provided through the provision of a method for re-routing a vehicle based on user-specific considerations. The method includes, for instance: monitoring, by one or more processors, activities of a user operating a vehicle comprising a navigational device, wherein the navigational device is providing route guidance to the user, via a first route, to a geographic destination, and wherein the vehicle is proceeding to the destination; based on the monitoring, identifying, by the one or more processors, driving patterns of the user to generate a driver profile for the user, wherein the driver profile comprises a baseline activity pattern of the user, when the user is operating the vehicle; determining, by the one or more processors, at a given time, that the monitored activities of the user are outside of the baseline activity level; enabling, by the one or more processors, based on determining that the monitored activities of the user are outside of the baseline activity level, an image capture device, wherein the image capture device is an integrated device of the vehicle, and wherein the image capture device is oriented to capture images of an environment outside of a the vehicle; utilizing, by the one or more processors, the image capture device, to capture images of the environment; deriving, by the one or more processors, data describing environmental conditions of the environment, from the images captured by the image capture device, based on performing a semantic analysis of the images captured by the image capture device; transmitting, by the one or more processors, the data to a repository, wherein the repository indexes the data by a location of the vehicle during the capturing, wherein the repository comprises additional data from additional vehicles, the additional data describing additional environmental conditions, the additional data indexed in the repository, by locations of the additional vehicles when the additional data was obtained, and by times when the additional data was obtained, and wherein the data and the additional data comprise repository data; generating, by the one or more processors, a second route to the destination, based on the driver profile and relevant data selected from the repository data, wherein the second route to the destination avoids one or more locations en route to the destination, wherein the relevant data indicates a given environmental condition at the one or more locations, and wherein the driver profile indicates a departure from the baseline activity pattern of the user, when the user experiences the given environmental condition, while operating the vehicle; and facilitating, by the one or more processors, an action in the navigational device related to changing the first route to the second route.

Shortcomings of the prior art are overcome and additional advantages are provided through the provision of a computer program product for re-routing a vehicle based on user-specific considerations. The computer program product comprises a storage medium readable by a processing circuit and storing instructions for execution by the processing circuit for performing a method. The method includes, for instance: monitoring, by the one or more processors, activities of a user operating a vehicle comprising a navigational device, wherein the navigational device is providing route guidance to the user, via a first route, to a geographic destination, and wherein the vehicle is proceeding to the destination; based on the monitoring, identifying, by the one or more processors, driving patterns of the user to generate a driver profile for the user, wherein the driver profile comprises a baseline activity pattern of the user, when the user is operating the vehicle; determining, by the one or more processors, at a given time, that the monitored activities of the user are outside of the baseline activity level; enabling, by the one or more processors, based on determining that the monitored activities of the user are outside of the baseline activity level, an image capture device, wherein the image capture device is an integrated device of the vehicle, and wherein the image capture device is oriented to capture images of an environment outside of a the vehicle; utilizing, by the one or more processors, the image capture device, to capture images of the environment; deriving, by the one or more processors, data describing environmental conditions of the environment, from the images captured by the image capture device, based on performing a semantic analysis of the images captured by the image capture device; transmitting, by the one or more processors, the data to a repository, wherein the repository indexes the data by a location of the vehicle during the capturing, wherein the repository comprises additional data from additional vehicles, the additional data describing additional environmental conditions, the additional data indexed in the repository, by locations of the additional vehicles when the additional data was obtained, and by times when the additional data was obtained, and wherein the data and the additional data comprise repository data; generating, by the one or more processors, a second route to the destination, based on the driver profile and relevant data selected from the repository data, wherein the second route to the destination avoids one or more locations en route to the destination, wherein the relevant data indicates a given environmental condition at the one or more locations, and wherein the driver profile indicates a departure from the baseline activity pattern of the user, when the user experiences the given environmental condition, while operating the vehicle; and facilitating, by the one or more processors, an action in the navigational device related to changing the first route to the second route.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
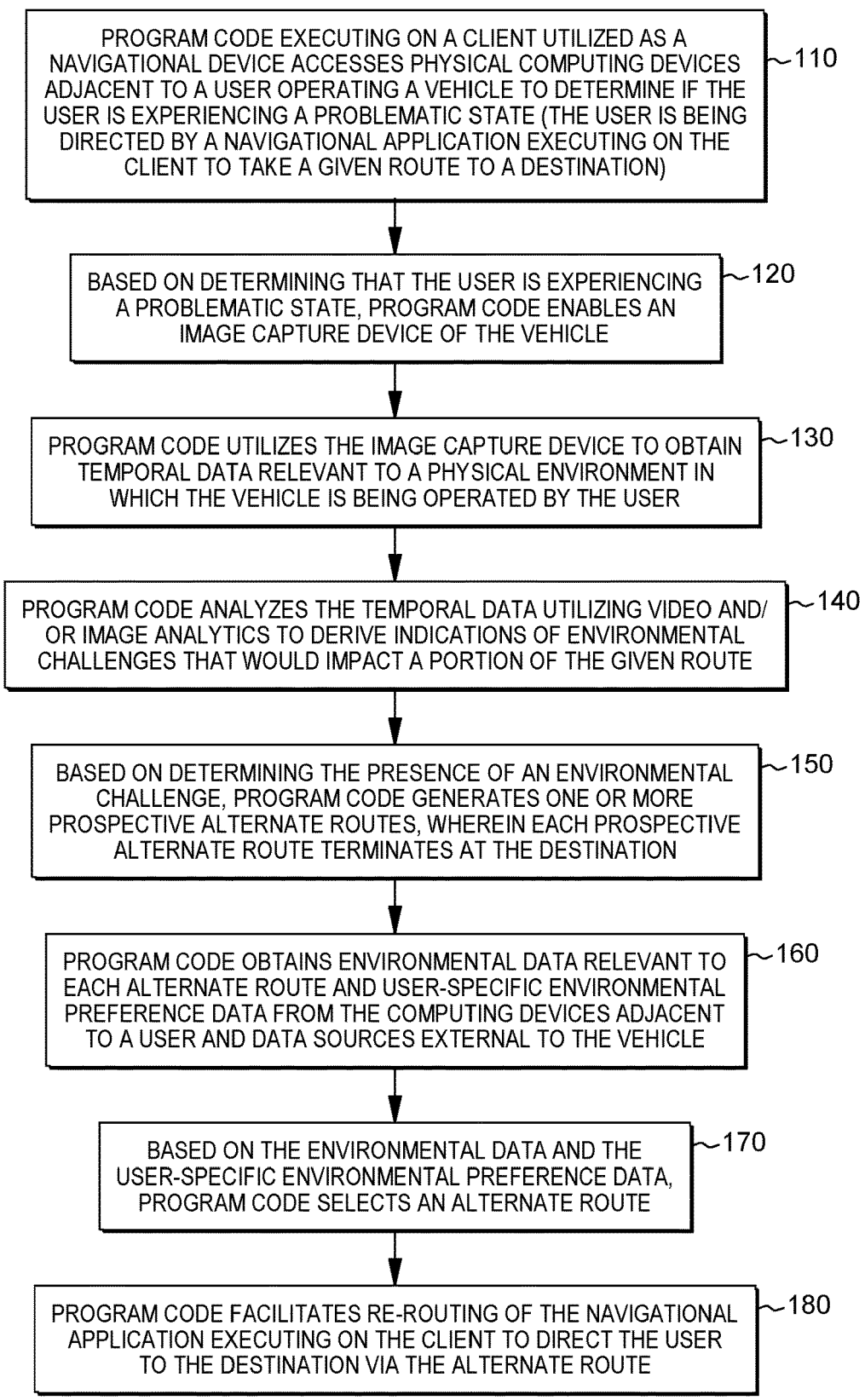
FIG. 1 is a workflow illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
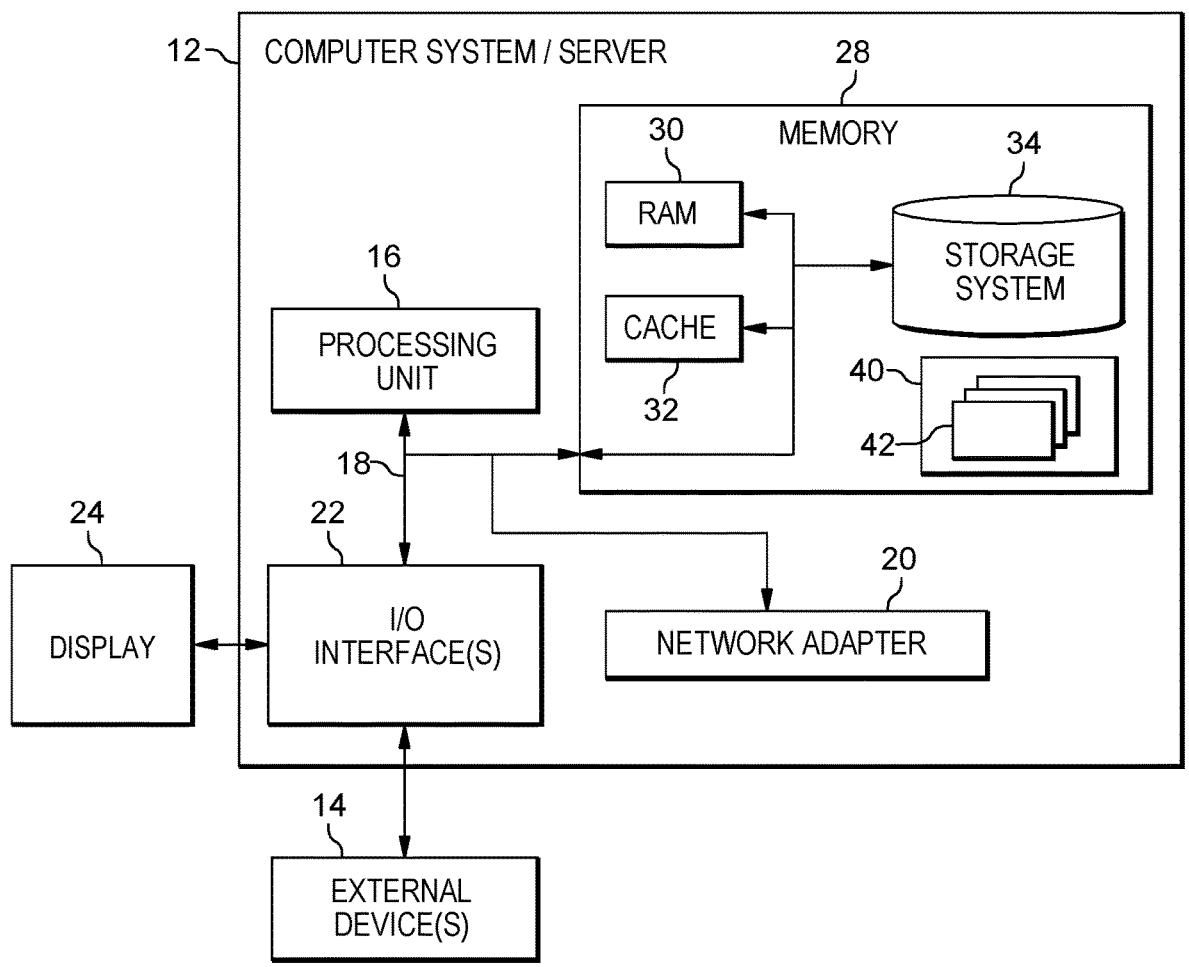
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, can be stored in memory 28.

Embodiments of the present invention include a computer-implemented method, a computer program product, and a computer system that include program code executed on at least one processing circuit that provides a customized re-routing of a user, including suggesting personalized environmentally aware routes to a user, based on identifying user-specific difficult driving conditions and predicting real-time environmental factors for route discovery. In some embodiments of the present invention, rather than suggest a new route to a user, the program code will automatically re-route the user, using a navigational computer application executing on a client device utilized by the user. In some embodiments of the present invention, the program code provides the following functionality when suggesting or configuring a new route for a user engaged in utilizing routing software to reach a given destination: 1) analyzing devices within a vehicle and the client device that provide data describing activity and motion of the user (e.g., brake, accelerator, gears, motion sensors, including but not limited to a gyroscope and an accelerometer) to identify difficult driving conditions experienced by the user; 2) determining environmental factors could impact feasibility of a planned (current) route, by analyzing on-board image capture devices to obtain environmental data, including but not limited, lighting conditions, fog conditions, local flooding, wind direction, and wind speed etc., by analyzing on-board camera images; and 3) customizing the new route to the user, based on determining that data obtained based on personal devices, including Internet of Things (IoT) devices, associated with the user and/or the routing by the client device, impacts the feasibility of a planned route or indicates a better (new route) than the planned route; this can data include, but is not limited to, user profile attributes, driving patterns, environmental data, and crowd-sourced route information.

Aspects of various embodiments of the present invention are inextricably linked to computing and provide improvements over existing computerized navigational techniques and systems. First, providing computer-assisted route guidance utilizing a navigational device, which may provide computerized route guidance based on communications with one or more of global positioning system (GPS) satellites and/or cellular phone network towers, is inextricably linked to computing, both because of the hardware and the software utilized to enable this functionality. Location services, in general, which include providing route guidance, with a navigational device, which is a computing device, is a functionality that is unique to computing and therefore, inextricably linked to computing.

Second, embodiments of the present invention represent an improvement over existing computerized navigational techniques at least because aspects in embodiments of the present invention address identifying spatio-temporal issues (i.e., issues belonging to both space and time or to space-time) that are visually detectable environmental problems at a lower processing cost, which is important in mobile computing, especially when a utilized mobile computing device is maintaining connectivity to additional computing resources, while in motion, in order to provide data for continued navigation support. This low processing/resource cost approach includes program code executed on at least one processor selectively capturing car video signals, by utilizing car-driving-patterns to determine the timing of the selective captures. For example, in embodiments of the present invention, the program code automatically collects video streams of the route taken by a vehicle (road, street, etc.), at points in time selected by the program code based on the vehicle's driving pattern. The program code predicts environmental problems at runtime, by correlating the collected video-signal and crowd-sourced data. These aspects limit processing and overhead because they reduce the volume of the data collected; the program code collects data in the instances when a driver faces difficulties and not at other times. In contrast, existing systems continuously or indiscriminately capture video, and analyze these video signals through semantic features, which is a very costly process. Additional processing cost in existing systems (avoided in embodiments of the present invention) is a burden on the power source(s) of the vehicle, which enables the video capture.

Embodiments of the present invention also represent an improvement over existing computerized navigational techniques because aspects in some embodiments of the present invention factor driver attributes into re-routing considerations. For example, different users (i.e., drivers) can have different priorities regarding various environmental driving issues. Thus, in some embodiments of the present invention, the program code determines, based on a user's activities while operating the vehicle, if the user is experiencing an environmental issue and either automatically changes the route provided through the navigational device (i.e., reroutes the user), or utilizes the interface of the navigational device to suggest a new/alternate route to the user, awaiting confirmation (e.g., verbal, haptic, manual entry, etc.) before adjusting the route. Thus, embodiments of the present invention can personalize routes provided by a navigational device based on personalized environmental risk sensitivity.

Aspects of some embodiments of the present invention provide route guidance to a user (i.e., driver) through a navigational device that is efficient, from a processing perspective, and personalized, based on environmental factors, as anticipated to be experienced by the driver. FIG. 1 provides a general workflow 100 of aspects of some embodiments of the present invention. Subsequent figures will expand upon the functionality illustrated in FIG. 1. In some embodiments of the present invention, program code executing on a client utilized as a navigational device accesses physical computing devices adjacent to a user operating a vehicle (e.g., personal computing device, Internet of Things devices, sensors, personal health trackers, physical activity trackers, smart watches, sensors integrated in the vehicle, computing devices integrated into the vehicle, instruments in the vehicle, etc.), to determine if the user is experiencing a problematic state (e.g., stress, unexpected movement, unexpected vital signs, performing unexpected maneuvering of the vehicle, etc.), where the user is being directed by a navigational application, executing on the client, to take a given route to a destination (110). In embodiments of the present invention, the devices accessed by the program code can include devices from the following categories: sensor technologies instrumented in the vehicle, computing resources of the vehicle, and/or personal computing devices of the user.

In embodiments of the present invention, the program code can assess whether a user is experiencing a problematic state, based on utilizing IoT devices associated with the user to assess a condition of the user. As understood by one of skill in the art, the Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object, including but not limited to, temperature and humidity. The smart sensors can be utilized to measure temperature, humidity, vibrations, motion, light, pressure and/or altitude. IoT devices also include individual activity and fitness trackers, which include (wearable) devices or applications that include smart sensors for monitoring and tracking fitness-related metrics such as distance walked or run, calorie consumption, and in some cases heartbeat and quality of sleep and include smartwatches that are synced to a computer or smartphone for long-term data tracking. Because the smart sensors in IoT devices carry unique identifiers, a computing system that communicates with a given sensor can identify the source of the information. Within the IoT, various devices can communicate with each other and can access data from sources available over various communication networks, including the Internet.

Returning to FIG. 1, based on determining that the user is experiencing a problematic state, the program code enables an image capture device of the vehicle (120). The program code utilizes the image capture device to obtain temporal data relevant to a physical environment in which the vehicle is being operated by the user (130). The program code analyzes the temporal data, utilizing video and/or image analytics, to derive indications of environmental challenges that would impact a portion of the given route (140). In some embodiments of the present invention, the program code obtains a raw video stream from the image capture device and utilizes the video and/or image analytics to translate the stream into attributes describing environmental conditions. The program code then identifies, among the attributes, any attributes that would impact a portion of the given route. In some embodiments of the present invention, the program code stores the attributes describing environmental conditions on a storage medium that is publicly accessible, indexing the data by location of the vehicle as well as by time (e.g., adding a timestamp). Thus, the storage media can be accessible to other drivers, to discover conditions experienced at the location, by the initial driver.

Based on determining the presence of an environmental challenge, the program code generates one or more prospective alternate routes, wherein each prospective alternate route terminates at the destination (150). In some embodiments of the present invention, program code interfaces with off-the-shelf navigational software. For example, the program code, based on determining that an environmental challenge exists, can request re-routing from the navigational application executing on the client. Responsive to the request from the program code, the navigational application provides the alternate routes.

The program code obtains environmental data relevant to each alternate route and user-specific environmental preference data from the computing devices adjacent to a user and data sources external to the vehicle (160). Based on the connectivity of the client and to both computing devices adjacent to the user operating a vehicle (e.g., personal computing device, Internet of Things devices, sensors, personal health trackers, physical activity trackers, smart watches, sensors integrated in the vehicle, instruments in the vehicle, etc.), as well as additional computing resources comprising data sources external to the vehicle (e.g., social media platforms), program code in embodiments of the present invention can access these additional computing resources to gather personal information about the user, as well as data relevant to any potential routes the navigational application may re-route a user through. For example, social media platforms can provide data relevant to a user's environmental preferences, as well as first-hand accounts of weather affected areas en route to the destination. In embodiments of the present invention where the program code retains spatio-temporal data related to environmental conditions discovered by analyzing images captured, the program code can access the repository and obtain data provided by other drivers regarding spatio-temporal conditions at other locations, including locations that the driver would pass through, depending upon the new route generated by the program code.

The program code can utilize this information to generate or update user-specific preference environmental data. For example, the user can utilize a personal computing device to connect to various computing resources (e.g., IoT devices and social media platforms) to manage user profiles, configure social media accounts, define preferences, obtain biometrics and other health measurements, etc. The program code in embodiments of the present invention can intercept or observe these communications and/or can take advantage of the connectivity of the personal computing device to these external resources. Based on this connectivity, the program code can obtain data user-specific environmental preference data for user profile, which the program code can store and maintain (e.g., update, based on temporal variations in personal data) on the client. In some embodiments of the present invention, the program code can also obtain user-specific environmental preference data by accessing historical driving patterns stored by the client that include car-driving patterns of the user, when the user is facing specific environmental issues. The user-specific environmental preference data includes personalized environmental risk sensitivities, which would provide reasoning behind taking one alternate route over another. Different users may have different priorities towards various environmental problems. The particular sensitivities of a given user can be captured by the program code in that user's user-specific environmental preference data. Thus, the program code personalizes re-routing to the individual sensitivities of a user.

Based on the environmental data and the user-specific environmental preference data, the program code selects an alternate route (170). The program code facilitates re-routing of the navigational application executing on the client to direct the user to the destination, via the alternate route (180). In some embodiments of the present invention, the program code, through the interface of the client, suggests re-routing to the user. The suggestion can include data (provided visually and/or audibly) supporting the suggestion with one or more recommendations, based on one or more of the environmental data and/or the user-specific environmental preference data. The user can accept or decline the suggestion. An acceptance would trigger re-routing. In some embodiments of the present invention, the program code automatically facilitates the re-routing without user interaction. In some embodiments of the present invention, the program code can utilize environmental data and the user-specific environmental preference data, when first generating an initial route for a given user.

Figure 2:
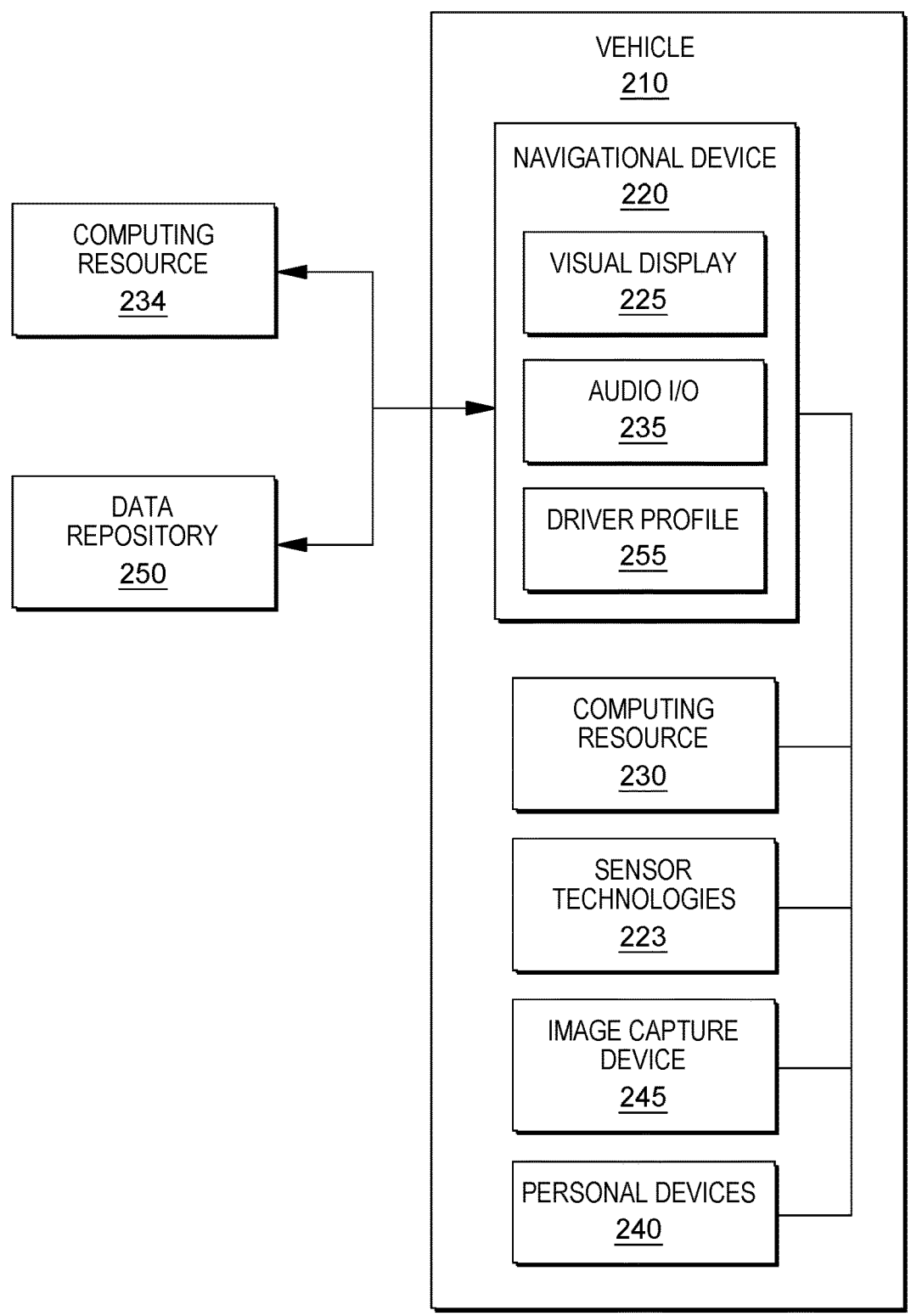
FIG. 2 is an illustration of various aspects of some embodiments of the present invention.

FIG. 2 is a block diagram that illustrates various aspects of a technical environment 200 into which aspects of the present invention can be implemented. This technical environment 200 is provided for illustrative purposes only, in order to depict certain aspects of some embodiments of the present invention and in particular, is utilized to highlight two aspects: 1) selective capture of spatio-temporal environmental conditions (e.g., FIGS. 1, 110, 120, 130); and 2) determining a personalized alternate route to a destination based on a driver's anticipated reactions to the captured spatio-temporal environmental conditions and anticipated spatio-temporal en route to the destination (e.g., FIG. 1, 160, 170). To further illustrate these aspects, while reviewing FIG. 2, which depicts a technical environment, FIG. 3, which is a workflow 300 illustrating various aspects of some embodiments of the present invention, will be referenced as well.

Figure 3:
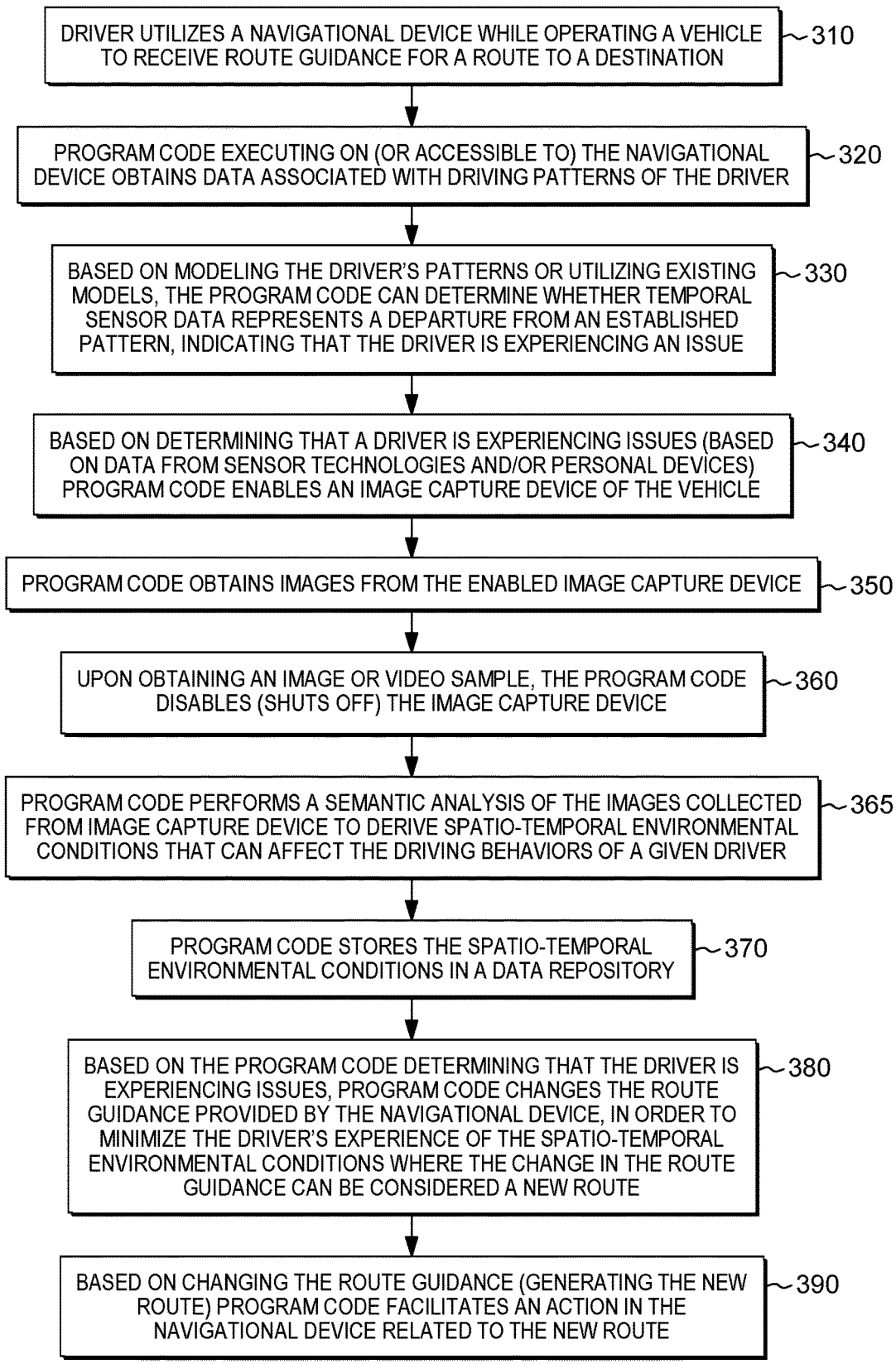
FIG. 3 is a workflow illustrating certain aspects of an embodiment of the present invention.

Referring to FIG. 2, a vehicle 210, operated by a driver (user), includes sensor technologies 223 instrumented in at least the vehicle brake and the vehicle accelerator. The driver utilizes a navigational device 220 while operating the vehicle 210 to receive route guidance for a route to a destination (FIG. 3, 310). The navigational device 220 may be a stand-alone device or the navigation may be provided by an application executing on a personal computing resource (e.g., smartphone). The navigational device 220 provides route guidance (maps, directions, etc.) utilizing a visual display 225 and an audio input/output 235 (there can also be a haptic input), which can be integrated in the navigational device 220 and/or a computing resource 230 of the vehicle 210, in this example. The computing resource 230 of the vehicle 210 monitors the sensor technologies 223 and alerts the driver in case there is an issue. For example, the computing resource 230 may obtain an indication from a sensor monitoring levels in a gas tank that the gas level is below a given threshold. The computing resource 230 would alert the user of the low fuel level.

As briefly mentioned above, in some embodiments of the present invention, the navigational device 220 is an application executed by the computing resource 230 of the vehicle 210. In this case, the visual display 225 and the audio input/output 235 utilized by the navigational device 220 would be integrated into the vehicle 210. In some embodiments of the present invention, although the navigational device 220 is not the computing resource 230, the navigational device 220 utilizes the visual display 225 and an audio input/output 235 resident in the vehicle 210, rather than an output or screen on the device itself.

In some embodiments of the present invention, the program code executing on (or accessible to) the navigational device 220 obtains data associated with driving patterns of the driver (FIG. 3, 320). Depending on the complexity of the computing resources 230 of the vehicle, the source of the data can differ. For example, in some high end vehicles, the computing resource 230 monitors the sensor technologies 223 and models the data to determine driving pattern by utilizing machine learning algorithms. In some embodiments of the present invention, modeled data is not available from the computing resource 230, so the program code obtains raw sensor data from the computing resource 230 and applies machine learning algorithms to model the driver's driving patterns.

The user's driving patterns comprise a driver profile 255, which can be stored on various local and/or external computing devices, including, but not limited to, the computing resource 230 of the vehicle 210, the navigational device 220, and/or an external computing resource 234, including but not limited to, a cloud computing resource. In the illustrated embodiment, the driver profile 255 is retained by the program code on the navigational device 220. The program code generates a user profile for each driver of a given vehicle. The program code can identify various users in a variety of ways, including but not limited to, by identifiers on the one or more personal devices 240 (e.g., IoT devices, sensors, personal health trackers, physical activity trackers, smart watches, etc.) of a given driver and/or by soliciting identifying entries (e.g., username, user identifier, password, etc.) of the driver, when the driver is initiating the navigational device 220. As understood by one of skill in the art, a sensor-rich environment, such as a vehicle, can employ various existing recognition technologies to identify a given driver. Because the driver profile is comprised of current and historical driving data describing behaviors of the driver, the program code can access this profile to identify the driver's past car-driving pattern difficulties when faced with various environmental issues. Different environmental problems could be critical to different drivers, based on the tolerance level of the driver, the car or car model, the past experience of the driver, etc.

As aforementioned, the program code applies machine learning algorithms to model the driver's driving patterns and to generate a driver profile 255. The program code can train these algorithms, based on patterns for the driver (or across all drivers). Embodiments of the present invention can integrate existing driver profile 255 modeling tools, which may already be integrated into the vehicle 210 as in some vehicles, a computing resource 230 tracks driver activity, compiles a driving reports, and sends these reports to an insurance company.

Figure 4:
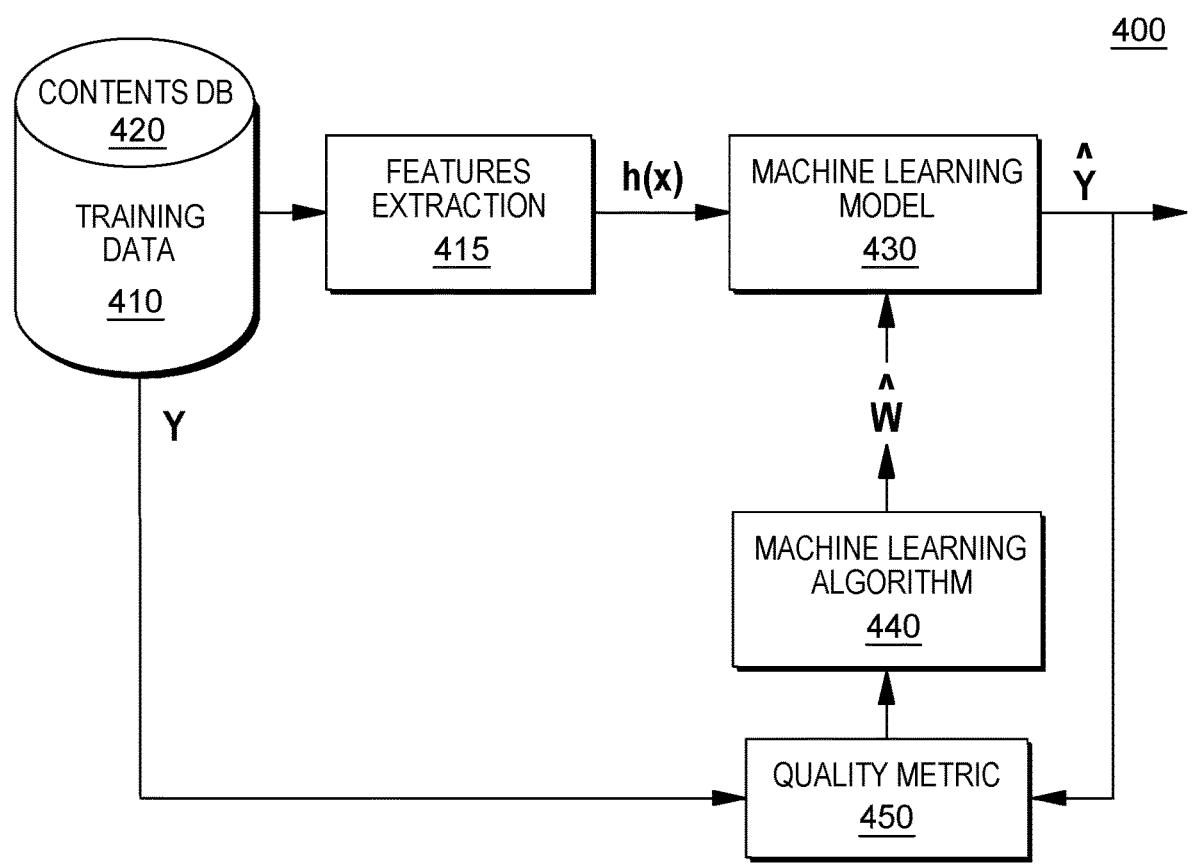
FIG. 4 is an illustration of various aspects of some embodiments of the present invention.

FIG. 4 is an example of a machine learning training system 400 that can be utilized to perform cognitive analyses of sensor and externally located (social media, etc.) data to generate a driver profile in embodiments of the present invention. Machine learning (ML) solves problems that cannot be solved by numerical means alone. In this ML-based example, program code extracts various features/attributes from training data 440, which may be resident in one or more databases 420 comprising sensor data (e.g., computing resource 230, FIG. 2). The features are utilized to develop a predictor function, h(x), also referred to as a hypothesis, which the program code utilizes as a machine learning model 430. In identifying various features/attributes (e.g., patterns) in the training data 410, the program code may utilize various techniques including, but not limited to, mutual information, which is an example of a method that can be utilized to identify features in an embodiment of the present invention. Further embodiments of the present invention utilize varying techniques to select features (elements, patterns, attributes, etc.), including but not limited to, diffusion mapping, principal component analysis, recursive feature elimination (a brute force approach to selecting features), and/or a Random Forest, to select the features. The program code may utilize a machine learning algorithm 440 to train the machine learning model 430 (e.g., the algorithms utilized by the program code), including providing weights for the conclusions, so that the program code can prioritize various environmental conditions based on severity of the effect of the conditions of the driver's performance operating the vehicle (e.g., FIG. 2, 210) in accordance with the predictor functions that comprise the machine learning model 430. The conclusions may be evaluated by a quality metric 450. By selecting a diverse set of training data 410, the program code trains the machine learning model 430 to identify and weight various attributes (e.g., features, patterns) that correlate to various environmental conditions.

Based on modeling the driver's patterns or utilizing existing models, the program code can determine whether temporal sensor data represents a departure from an established pattern, indicating that the driver is experiencing an issue (FIG. 3, 330). Another potential source of data that the program code can utilize alone, or in conjunction with sensor data, to determine that a driver is experiencing an issue, are one or more personal devices 240 (e.g., IoT devices, sensors, personal health trackers, physical activity trackers, smart watches, etc.), which the driver may be utilizing while operating the vehicle 210. Program code in an embodiment of the present invention can obtain data from these personal devices 240 indicating that the driver is experiencing an issue (e.g., elevated heartrate, erratic movement, elevated body temperature, etc.). For example, a personal device worn by the user can include an accelerometer and/or a gyroscope. The program code can utilize these motion sensing devices to identify departures from an expected motion pattern of the driver.

In some embodiments of the present invention, the program code applies a machine learning algorithm to identify specific elements in the collected driver data that depart from expected behaviors in the driver profile, including but not limited to data obtained by the program code from sensor technologies 223 and/or personal devices 240. The presence of any of these specific elements indicates that the driver is experiencing issues, these specific elements can include, but are not limited to: 1) the driver is driving more slowly than expected; 2) the driver is pressing the brakes more often than expected; 3) the driver has changed gear more frequently than expected; and/or 4) data collected from a gyroscope/accelerometer indicates more driver movement than expected (e.g., the driver is restless).

Based on determining that a driver is experiencing issues (based on data from sensor technologies 223 and/or personal devices 240), the program code enables an image capture device 245 of the vehicle 210 (FIG. 3, 340). Vehicles 210 include one or more integrated image capture devices 245, including but not limited to, back up cameras and other visual parking assistance camera. In some embodiments of the present invention, the program code enables (e.g., switches on) an image capture device 245 by turning on a car headlight camera, a review view camera, a side view camera, and/or a front view camera. By capturing images and/or video (i.e., spatio-temporal data) of the current environment 200 in which the driver is navigating, the program code can determine the environmental conditions that have affected the driver's driving, which will provide insight when the navigational device 220 re-routes the driver. The program code obtains images from the enabled image capture device 245 (FIG. 3, 350). Upon obtaining an image or video sample, the program code disables (shuts off) the image capture device 245 (FIG. 3, 360). The amount of images or video can be configured to be an amount of time, for example, thirty seconds. Alternatively, the program code can perform a semantic analysis of the data, progressively, as it is captured, and turn off the camera when the program code identifies spatio-temporal environmental conditions in the images or video.

As aforementioned, in some embodiments of the present invention, the program code performs a semantic analysis of the images collected from image capture device to derive spatio-temporal environmental conditions that can affect the driving behaviors of a given driver (FIG. 3, 365). Spatio-temporal environmental conditions that can affect the driving behaviors of a driver that can be discovered by analyzing images obtained by the program code from the image capture device 245 include, but are not limited to: lighting conditions on the road, which might obstruct a driver's view (e.g., direct sun light glare), fog, which may also obstruct a driver's view, and/or water logging, due to rain. In an embodiment of the present invention, the program code stores the spatio-temporal environmental conditions in a data repository 250 (FIG. 3, 370). The data repository 250 is publicly accessible and when the program code stores the spatio-temporal environmental conditions, the records saved by the program code are indexed by location and time. The program code can specify the location in various ways, including by address, road, GPS coordinates, etc. Thus, this repository 250 can be utilized to crowdsource environmental conditions at various locations at various times. The data repository 250 can be understood as a crowd-sourced data resource because it receives and compiles data from different navigational devices, utilized by different user (i.e., a crowd), which will be discussed further in reference to FIG. 5.

Based on the program code determining that the driver is experiencing issues, the program code changes the route guidance provided by the navigational device 220, in order to minimize the driver's experience of the spatio-temporal environmental conditions, where the change in the route guidance can be considered a new route (FIG. 3, 380). The program code determines how to change the route guidance by accessing the aforementioned driver profile of the driver. When re-routing the driver, the program code analyzes not only environmental data in the repository 250 that is spatio-temporally relevant to via-points on a newly generated route to the destination, but also, indications in the driver profile, which allow the program code to determine the impact of each relevant environmental issue in the data that could potentially affect the driver. Thus, the program code can generate a shortest new route which is predicted to include the fewest environmental conditions that impact the driving of the user. For example, the program code can generate a route that does not include any environmental conditions that would affect the user to a certain degree (or threshold).

Based on changing the route guidance (generating the new route) the program code facilitates an action in the navigational device 220 related to the new route (FIG. 3, 390). In some embodiments of the present invention, the program code automatically changes the route to the new route in the navigational device 220. In some embodiments of the present invention, the program code utilizes one or more of the visual display 225 and/or the audio input/output 235 to suggest the new route to the driver, enabling the driver to select or reject the new route. The program code can update the driver profile based on the response.

Figure 5:
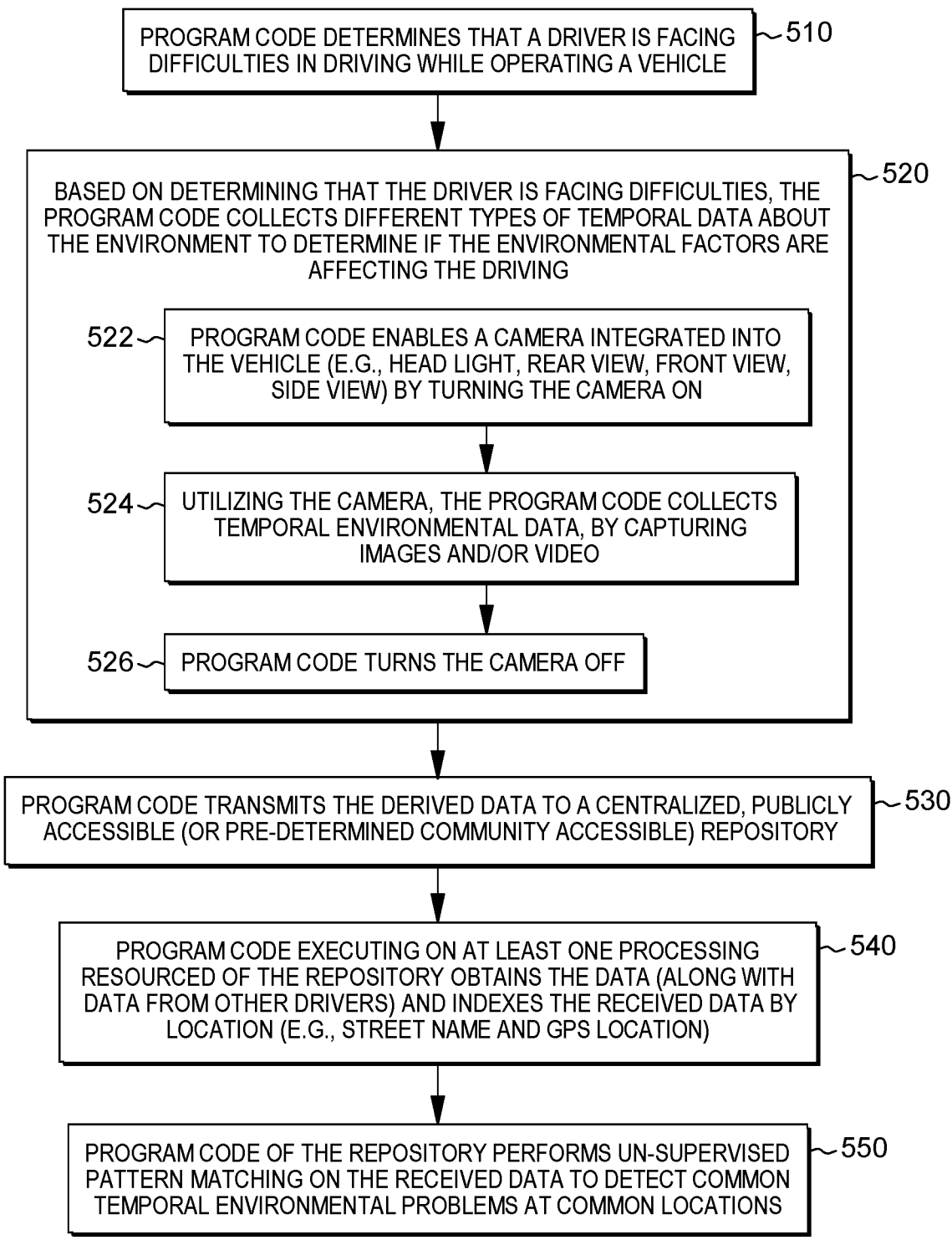
FIG. 5 is a workflow illustrating certain aspects of an embodiment of the present invention.

FIG. 5 is a workflow 500 that further illustrates the program code generating, maintaining, and applying, a driver profile to select a new route (or in some embodiments, an initial route) for a given driver, in some embodiments of the present invention. In some embodiments of the present invention, the program code determines that a driver is facing difficulties in driving while operating a vehicle (510). Based on determining that the driver is facing difficulties, the program code collects different types of temporal data about the environment to determine if the environmental factors are affecting the driving (520). In order to collect the data, the program code enables a camera integrated into the vehicle (e.g., head light, rear view, front view, side view) by turning the camera on (522). Utilizing the camera, the program code collects temporal environmental data, by capturing images and/or video (524). The program code performs semantic analysis of the images collected from camera to derive temporal environmental data, including but not limited to: data related to lighting conditions on the road, data related to fog conditions, data related to water logging, data related to high beam headlights from other vehicles coming from an opposite side of the road; data related to the direction of the wind. Upon completion of the collection, the program code turns the camera off (526). The program code transmits the derived data to a centralized, publicly accessible (or pre-determined community accessible) repository (530) which may be understood as a crowd-sourced repository because it includes data from various drivers. Program code executing on at least one processing resourced of the repository obtains the data (along with data from other drivers) and indexes the received data by location (e.g., street name and GPS location) (540). The program code of the repository performs un-supervised pattern matching on the received data to detect common temporal environmental problems at common locations (550). Thus, as also illustrated in FIGS. 1 and 3, the program code considers environmental data from the repository, together with a driver profile of a user, when generating a route for a user to a destination.

Embodiments of the present invention include a computer-implemented method, a computer program product, and a computer system, where program code executing on one or more processors monitors activities of a user operating a vehicle including a navigational device, where the navigational device is providing route guidance to the user, via a first route, to a geographic destination, and where the vehicle is proceeding to the destination. Based on the monitoring, the program code identifies driving patterns of the user to generate a driver profile for the user, where the driver profile includes a baseline activity pattern of the user, when the user is operating the vehicle. The program code determines, at a given time, that the monitored activities of the user are outside of the baseline activity level. The program code enables, based on determining that the monitored activities of the user are outside of the baseline activity level, an image capture device, where the image capture device is an integrated device of the vehicle, and where the image capture device is oriented to capture images of an environment outside of a the vehicle. The program code utilizes the image capture device, to capture images of the environment. The program code derives data describing environmental conditions of the environment, from the images captured by the image capture device, based on performing a semantic analysis of the images captured by the image capture device. The program code transmits the data to a repository, where the repository indexes the data by a location of the vehicle during the capturing, where the repository includes additional data from additional vehicles, the additional data describing additional environmental conditions, the additional data indexed in the repository, by locations of the additional vehicles when the additional data was obtained, and by times when the additional data was obtained, and where the data and the additional data comprise repository data. The program code generates a second route to the destination, based on the driver profile and relevant data selected from the repository data, where the second route to the destination avoids one or more locations en route to the destination, where the relevant data indicates a given environmental condition at the one or more locations, and where the driver profile indicates a departure from the baseline activity pattern of the user, when the user experiences the given environmental condition, while operating the vehicle. The program code facilitates an action in the navigational device related to changing the first route to the second route. In some embodiments of the present invention, the action selected from the group consisting of: automatically changing the route guidance to provide revised route guidance to the user, via the second route, through the navigational device, and prompting the user, through an interface of the navigational device, to confirm the changing the route guidance to the revised route guidance.

In some embodiments of the present invention, the action consists of prompting the user to confirm the changing the route guidance to the revised route guidance, and the program code obtains a response to the prompting. The program code updates the driver profile based on the response. In some embodiments of the present invention, the action consists of prompting the user to confirm the changing the route guidance to the revised route guidance and the prompting includes a description of the given environmental condition avoided in the second route.

In some embodiments of the present invention, the monitoring by the program code includes the program code obtaining data describing behaviors of the user, when operating the vehicle, from one or more sources selected from the group consisting of: sensor technologies instrumented in the vehicle, computing resources of the vehicle, and personal computing devices of the user. The one or more sources can include a sensor technology of the sensor technologies and the program code obtains a portion of the data describing behaviors of the user from the sensor technology, based on the sensor technology obtaining the data from monitoring a component selected from the group consisting of: brake, accelerator, and gear. The one or more sources can include a personal device of the personal devices, where program code obtains a portion of the data describing behaviors of the user from the personal device, based on the personal device including at least one component selected from the group consisting of: an accelerometer, and a gyroscope.

In some embodiments of the present invention, the program code disables the image capture device, based on a factor selected from the group consisting of: passage of a pre-determined interval and completion of the deriving.

In some embodiments of the present invention, the program code generates the second route to the destination by also: determining, based on accessing the repository, one or more locations to avoid based on the repository data indicating various environmental conditions at the one or more locations to avoid. The program code also analyzes the driver profile, to identify the given environmental condition, among the various environmental conditions. The program code also identifies the one or more locations en route to the destination from the one or more locations to avoid based. The program code generates the second route, where the second route includes a shortest route to the destination avoiding the one or more locations en route to the destination.

In some embodiments of the present invention, the image capture device is selected from the group consisting of: a headlight camera, a review view camera, a side view camera, and a front view camera.

In some embodiments of the present invention, the images of the environment include video.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, in FIG. 2, computing resource 234 and data repository 250 can each be understood as a cloud computing node 10 (FIG. 6) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 6, computer system/server 12 that can be utilized as cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. As understood by one of skill in the art, another area in which aspects of the present invention can be utilized is quantum computing. For example, aspects of embodiments of the present invention can be utilized in conjunction with solving the so-called "dinner party problem" (i.e., "How many people must you have at dinner to ensure that there are a subset of 3 people who all either mutual acquaintances, or mutual strangers?"). Because aspects of the present invention generate correlations between IT issues and business events, utilizing sources both internal and external to a given computing system, program code in embodiments of the present invention is applicable to correlation building to solve other problems. As embodiments of the present invention can be used as an alternative/improved solution to the correlation between business and IT environments for large IT environments with complex businesses processes, applying this functionality to the "dinner party problem" and other situations where correlation building is desired would be advantageous.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
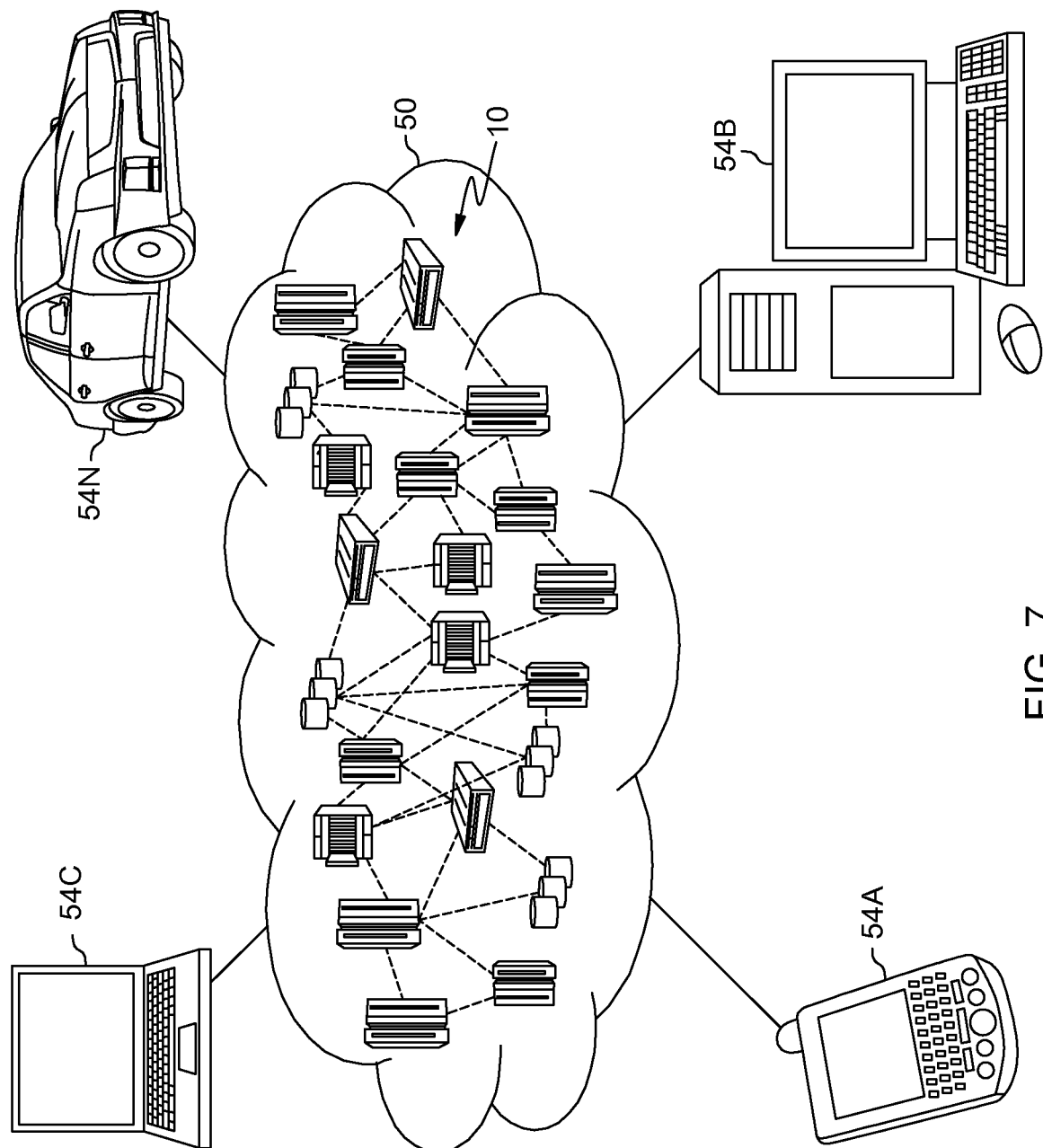
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
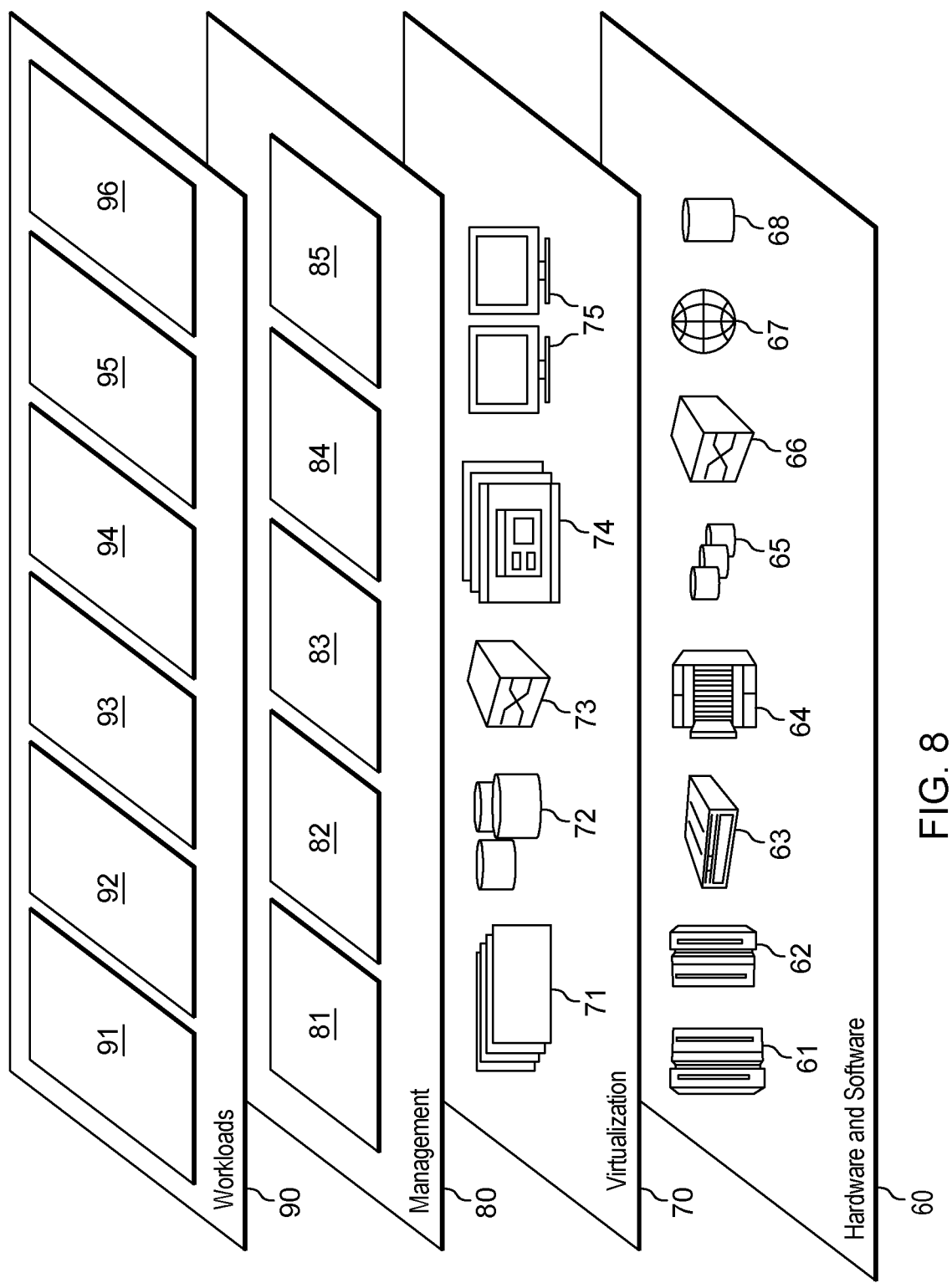
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and routing a navigational system based on personalized spatio-temporal considerations 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
monitoring, by one or more processors, activities of a user operating a vehicle comprising a navigational device, wherein the navigational device is providing route guidance to the user, via a first route, to a geographic destination, and wherein the vehicle is proceeding to the destination;
based on the monitoring, identifying, by the one or more processors, driving patterns of the user to generate a driver profile for the user, wherein the driver profile comprises a baseline activity pattern of the user, wherein the baseline activity pattern of the user comprises expected behaviors of the driver when the user is operating the vehicle, the expected behaviors comprising one or more of: a range of expected speeds for the driver, a number of expected gear changes in a predetermined time period for the driver, a frequency with which the driver is expected to press the brake within the predetermined amount of time, or a level of expected movement activity of the driver;
determining, by the one or more processors, at a given time, that the monitored activities of the user are outside of the baseline activity level, wherein the determination is selecting from the group consisting of: the driver is driving more slowly than expected, the driver is pressing the brakes more often than expected within the predetermined period of time, the driver has changed gears more frequently than expected in the predetermined period of time, and data collected from a gyroscope or accelerometer communicatively coupled to the one or more processors indicates more driver movement than expected in the predetermined period of time;

enabling, by the one or more processors, based on determining that the monitored activities of the user are outside of the baseline activity level, an image capture device, wherein the image capture device is an integrated device of the vehicle, and wherein the image capture device is oriented to capture images of an environment outside of a the vehicle;

based on the enabling, utilizing, by the one or more processors, the image capture device, to capture images of the environment;

deriving, by the one or more processors, data describing environmental conditions of the environment, from the images captured by the image capture device, based on performing a semantic analysis of the images captured by the image capture device;

transmitting, by the one or more processors, the data to a repository, wherein the repository indexes the data by a location of the vehicle during the capturing, wherein the repository comprises additional data from additional vehicles, the additional data describing additional environmental conditions, the additional data indexed in the repository, by locations of the additional vehicles when the additional data was obtained, and by times when the additional data was obtained, and wherein the data and the additional data comprise repository data;

generating, by the one or more processors, a second route to the destination, based on the driver profile and relevant data selected from the repository data, wherein the second route to the destination avoids one or more locations en route to the destination, wherein the relevant data indicates a given environmental condition at the one or more locations, and wherein the driver profile indicates a departure from the baseline activity pattern of the user, when the user experiences the given environmental condition, while operating the vehicle; and facilitating, by the one or more processors, an action in the navigational device related to changing the first route to the second route.

2. The computer-implemented method of claim 1, wherein the action is selected from the group consisting of: automatically changing the route guidance to provide revised route guidance to the user, via the second route, through the navigational device, and prompting the user, through an interface of the navigational device, to confirm the changing the route guidance to the revised route guidance.

3. The computer-implemented method of claim 2, wherein the action consists of prompting the user to confirm the changing the route guidance to the revised route guidance, the method further comprising:

obtaining, by the one or more processors, a response to the prompting;

updating, by the one or more processors, the driver profile based on the response.

4. The computer-implemented method of claim 3, wherein the action consists of prompting the user to confirm the changing the route guidance to the revised route guidance, wherein the prompting comprises a description of the given environmental condition avoided in the second route.

5. The computer-implemented method of claim 1, wherein the monitoring comprises obtaining data describing behaviors of the user, when operating the vehicle, from one or more sources selected from the group consisting of: sensor technologies instrumented in the vehicle, computing resources of the vehicle, and personal computing devices of the user.

6. The computer-implemented method of claim 5, wherein the one or more sources comprise a sensor technology of the sensor technologies, wherein the one or more processors obtain a portion of the data describing behaviors of the user from the sensor technology, based on the sensor technology obtaining the data from monitoring a component selected from the group consisting of: brake, accelerator, and gear.

7. The computer-implemented method of claim 5, wherein the one or more sources comprise a personal device of the personal devices, wherein the one or more processors obtain a portion of the data describing behaviors of the user from the personal device, based on the personal device comprising the gyroscope or the accelerometer.

8. The computer-implemented method of claim 7, further comprising:

disabling, by the one or more processors, the image capture device, based on a factor selected from the group consisting of: passage of a pre-determined interval and completion of the deriving.

9. The computer-implemented method of claim 1, the generating the second route to the destination further comprising:

determining, by the one or more processors, based on accessing the repository, one or more locations to avoid based on the repository data indicating various environmental conditions at the one or more locations to avoid;

analyzing, by the one or more processors, the driver profile, to identify the given environmental condition, among the various environmental conditions;

identifying, by the one or more processors, the one or more locations en route to the destination from the one or more locations to avoid based; and generating, by the one or more processors, the second route, wherein the second route comprises a shortest route to the destination avoiding the one or more locations en route to the destination.

10. The computer implemented method of claim 1, wherein the image capture device is selected from the group consisting of: a headlight camera, a review view camera, a side view camera, and a front view camera.

11. The computer implemented method of claim 1, wherein the images of the environment comprise video.

12. A computer program product comprising:

a computer readable storage medium readable by one or more processors and storing instructions for execution by the one or more processors for performing a method comprising:

monitoring, by the one or more processors, activities of a user operating a vehicle comprising a navigational device, wherein the navigational device is providing route guidance to the user, via a first route, to a geographic destination, and wherein the vehicle is proceeding to the destination;

based on the monitoring, identifying, by the one or more processors, driving patterns of the user to generate a driver profile for the user, wherein the driver profile comprises a baseline activity pattern of the user, when the user is operating the vehicle;

based on the monitoring, identifying, by the one or more processors, driving patterns of the user to generate a driver profile for the user, wherein the driver profile comprises a baseline activity pattern of the user, wherein the baseline activity pattern of the user comprises expected behaviors of the driver when the user is operating the vehicle, the expected behaviors comprising one or more of: a range of expected speeds for the driver, a number of expected gear changes in a pre-determined time period for the driver, a frequency with which the driver is expected to press the brake within the predetermined amount of time, or a level of expected movement activity of the driver;

determining, by the one or more processors, at a given time, that the monitored activities of the user are outside of the baseline activity level, wherein the determination is selecting from the group consisting of: the driver is driving more slowly than expected, the driver is pressing the brakes more often than expected within the predetermined period of time, the driver has changed gears more frequently than expected in the predetermined period of time, and data collected from a gyroscope or accelerometer communicatively coupled to the one or more processors indicates more driver movement than expected in the predetermined period of time;

enabling, by the one or more processors, based on determining that the monitored activities of the user are outside of the baseline activity level, an image capture device, wherein the image capture device is an integrated device of the vehicle, and wherein the image capture device is oriented to capture images of an environment outside of a the vehicle;

based on the enabling, utilizing, by the one or more processors, the image capture device, to capture images of the environment;

deriving, by the one or more processors, data describing environmental conditions of the environment, from the images captured by the image capture device, based on performing a semantic analysis of the images captured by the image capture device;

transmitting, by the one or more processors, the data to a repository, wherein the repository indexes the data by a location of the vehicle during the capturing, wherein the repository comprises additional data from additional vehicles, the additional data describing additional environmental conditions, the additional data indexed in the repository, by locations of the additional vehicles when the additional data was obtained, and by times when the additional data was obtained, and wherein the data and the additional data comprise repository data;

generating, by the one or more processors, a second route to the destination, based on the driver profile and relevant data selected from the repository data, wherein the second route to the destination avoids one or more locations en route to the destination, wherein the relevant data indicates a given environmental condition at the one or more locations, and wherein the driver profile indicates a departure from the baseline activity pattern of the user, when the user experiences the given environmental condition, while operating the vehicle; and facilitating, by the one or more processors, an action in the navigational device related to changing the first route to the second route.

13. The computer program product of claim 12, wherein the action is selected from the group consisting of: automatically changing the route guidance to provide revised route guidance to the user, via the second route, through the navigational device, and prompting the user, through an interface of the navigational device, to confirm the changing the route guidance to the revised route guidance.

14. The computer program product of claim 13, wherein the action consists of prompting the user to confirm the changing the route guidance to the revised route guidance, the method further comprising:
obtaining, by the one or more processors, a response to the prompting;
updating, by the one or more processors, the driver profile based on the response.

15. The computer program product of claim 13, wherein the action consists of prompting the user to confirm the changing the route guidance to the revised route guidance, wherein the prompting comprises a description of the given environmental condition avoided in the second route.

16. The computer program product of claim 12, wherein the monitoring comprises obtaining data describing behaviors of the user, when operating the vehicle, from one or more sources selected from the group consisting of: sensor technologies instrumented in the vehicle, computing resources of the vehicle, and personal computing devices of the user.

17. The computer program product of claim 16, wherein the one or more sources comprise a sensor technology of the sensor technologies, wherein the one or more processors obtain a portion of the data describing behaviors of the user from the sensor technology, based on the sensor technology obtaining the data from monitoring a component selected from the group consisting of: brake, accelerator, and gear.

18. The computer program product of claim 16, wherein the one or more sources comprise a personal device of the personal devices, wherein the one or more processors obtain a portion of the data describing behaviors of the user from the personal device comprising the gyroscope or the accelerometer.

19. A system comprising:
a memory;
one or more processors in communication with the memory;
program instructions executable by the one or more processors via the memory to perform a method, the method comprising:
monitoring, by the one or more processors, activities of a user operating a vehicle comprising a navigational device, wherein the navigational device is providing route guidance to the user, via a first route, to a geographic destination, and wherein the vehicle is proceeding to the destination;
based on the monitoring, identifying, by the one or more processors, driving patterns of the user to generate a driver profile for the user, wherein the driver profile comprises a baseline activity pattern of the user, wherein the baseline activity pattern of the user comprises expected behaviors of the driver when the user is operating the vehicle, the expected behaviors comprising one or more of: a range of expected speeds for the driver, a number of expected gear changes in a pre-determined time period for the driver, a frequency with which the driver is expected to press the brake within the predetermined amount of time, or a level of expected movement activity of the driver;

determining, by the one or more processors, at a given time, that the monitored activities of the user are outside of the baseline activity level, wherein the determination is selecting from the group consisting of: the driver is driving more slowly than expected, the driver is pressing the brakes more often than expected within the predetermined period of time, the driver has changed gears more frequently than expected in the predetermined period of time, and data collected from a gyroscope or accelerometer communicatively coupled to the one or more processors indicates more driver movement than expected in the predetermined period of time;

enabling, by the one or more processors, based on determining that the monitored activities of the user are outside of the baseline activity level, an image capture device, wherein the image capture device is an integrated device of the vehicle, and wherein the image capture device is oriented to capture images of an environment outside of a the vehicle;

based on the enabling, utilizing, by the one or more processors, the image capture device, to capture images of the environment;

deriving, by the one or more processors, data describing environmental conditions of the environment, from the images captured by the image capture device, based on performing a semantic analysis of the images captured by the image capture device;

transmitting, by the one or more processors, the data to a repository, wherein the repository indexes the data by a location of the vehicle during the capturing, wherein the repository comprises additional data from additional vehicles, the additional data describing additional environmental conditions, the additional data indexed in the repository, by locations of the additional vehicles when the additional data was obtained, and by times when the additional data was obtained, and wherein the data and the additional data comprise repository data;

generating, by the one or more processors, a second route to the destination, based on the driver profile and relevant data selected from the repository data, wherein the second route to the destination avoids one or more locations en route to the destination, wherein the relevant data indicates a given environmental condition at the one or more locations, and wherein the driver profile indicates a departure from the baseline activity pattern of the user, when the user experiences the given environmental condition, while operating the vehicle; and facilitating, by the one or more processors, an action in the navigational device related to changing the first route to the second route.

20. The system of claim 19, computer program product, wherein the action is selected from the group consisting of: automatically changing the route guidance to provide revised route guidance to the user, via the second route, through the navigational device, and prompting the user, through an interface of the navigational device, to confirm the changing the route guidance to the revised route guidance.

* * * * *